United States Patent
Depeweg et al.

(10) Patent No.: US 12,033,505 B2
(45) Date of Patent: Jul. 9, 2024

(54) METHOD FOR DETERMINING AT LEAST ONE REMAINING TIME VALUE, TO BE DETERMINED, FOR A SYSTEM

(71) Applicant: Yunex GmbH, Munich (DE)

(72) Inventors: Stefan Depeweg, Berlin (DE); Harald Frank, Höhenkirchen-Siegertsbrunn (DE); Michel Tokic, Tettnang (DE); Steffen Udluft, Eichenau (DE); Marc Christian Weber, Munich (DE)

(73) Assignee: YUNEX GMBH, Munich (DE)

( * ) Notice: Subject to any disclaimer, the term of this patent is extended or adjusted under 35 U.S.C. 154(b) by 69 days.

(21) Appl. No.: 17/783,289

(22) PCT Filed: Nov. 19, 2020

(86) PCT No.: PCT/EP2020/082674
§ 371 (c)(1),
(2) Date: Jun. 8, 2022

(87) PCT Pub. No.: WO2021/121849
PCT Pub. Date: Jun. 24, 2021

(65) Prior Publication Data
US 2023/0025935 A1    Jan. 26, 2023

(30) Foreign Application Priority Data
Dec. 16, 2019    (DE) .................... 10 2019 219 748.5

(51) Int. Cl.
*G08G 1/096*    (2006.01)
*G06F 18/21*    (2023.01)

(52) U.S. Cl.
CPC ........... *G08G 1/096* (2013.01); *G06F 18/217* (2023.01)

(58) Field of Classification Search
CPC ............................. G08G 1/096; G06F 18/217
See application file for complete search history.

(56) References Cited

U.S. PATENT DOCUMENTS

| | | | |
|---|---|---|---|
| 5,681,496 A | 10/1997 | Brownlow | |
| 7,796,053 B2 * | 9/2010 | Bortolono | G08G 1/096 340/929 |

(Continued)

FOREIGN PATENT DOCUMENTS

DE    69519775 T2    5/2001

OTHER PUBLICATIONS

Natafgi, Mohamad Belal et al.; "Smart Traffic Light System Using Machine Learning" 2018 IEEE International Multidisciplinary Conference on Engineering Technology (IMCET). IEEE, Nov. 14, 2018 (Nov. 14, 2018), pp. 1-6, XP033493195, DOI: 10.1109/IMCET.2018.8603041 [gefunden am Jan. 4, 2019] Abschnitt III A Abschnitt III C.

(Continued)

*Primary Examiner* — John A Tweel, Jr.
(74) *Attorney, Agent, or Firm* — Schmeiser, Olsen & Watts, LLP

(57) ABSTRACT

A computer-implemented method for determining at least one remaining time value, to be determined, for a system is provided, having the following steps: a. providing at least one known input data record containing a multiplicity of input elements for at least one determined time; b. providing at least one associated known remaining time value for the at least one input data record; c. determining the at least one remaining time value to be determined by applying an error function to the at least one input data record and the at least one associated remaining time value; and d. providing an output data record containing the at least one determined remaining time value and an associated reliability value. The invention furthermore targets a corresponding determination unit and computer program product.

8 Claims, 4 Drawing Sheets

(56) References Cited

U.S. PATENT DOCUMENTS

| | | | |
|---|---|---|---|
| 10,855,550 B2* | 12/2020 | Nikkhah | H04L 43/0894 |
| 2018/0096595 A1 | 4/2018 | Janzen et al. | |
| 2022/0415170 A1* | 12/2022 | Frank | G08G 1/0141 |
| 2023/0080193 A1* | 3/2023 | Depeweg | G08G 1/0129 |
| | | | 340/933 |

OTHER PUBLICATIONS

PCT International Search Report and Written Opinion of International Searching Authority dated Oct. 16, 2021 corresponding to PCT International Application No. PCT/EP2020/082674 filed Nov. 19, 2020.

* cited by examiner

METHOD FOR DETERMINING AT LEAST ONE REMAINING TIME VALUE, TO BE DETERMINED, FOR A SYSTEM

CROSS-REFERENCE TO RELATED APPLICATIONS

This application claims priority to PCT Application No. PCT/EP2020/082674, having a filing date of Nov. 19, 2020, which claims priority to DE Application No. 10 2019 219 748.5, having a filing date of Dec. 16, 2019, the entire contents both of which are hereby incorporated by reference.

FIELD OF TECHNOLOGY

The following relates to a method for determining at least one remaining time value, to be determined, for an installation. The following furthermore relates to a corresponding determination unit and to a computer program product.

BACKGROUND

Remaining value forecasts are known from the conventional art. The remaining time value in the remaining value forecasts is in this case the duration until the next changeover time of an installation. The remaining time value may also be considered to be a remaining time and the duration may be considered to be a time remaining. The installation may be any technical system, such as a light signal installation.

In the case of a correct remaining value forecast, the duration until a changeover time of a technical system may normally be counted down linearly as time progresses. The remaining time value may however be influenced significantly by various factors, for example by the flow of traffic or the behavior of road users. The remaining time value may thereby fluctuate significantly. Unpredicted or unexpected events may also occur.

By way of example, consideration is given below to the remaining value forecast of a light signal installation as installation, in which consideration is given to the duration of a changeover time, located in the future, of a signal group. With regard to the light signal installation, a public transport registration process or a detector triggered by the road user may for example significantly influence the remaining value.

The forecast remaining time value is used as a basis for a decision, for example by the driver of a vehicle, by an automated driving system, or a route optimization system. It is therefore necessary to provide a correct and reliable forecast of the remaining time.

Known approaches consist of a statistical approach, in part from the field of machine learning, which uses past data to calculate a forecast of the remaining time or probability of green for the light signal installation. Examples of past data are signals from detectors, signal groups, public transport messages, camera signals or other input elements. Examples of detectors are buttons for pedestrians or signal strips in the road.

One disadvantage of the known approaches is however that the situational uncertainty of the forecast is not given sufficient consideration. The uncertainty in the remaining time forecasts according to the conventional art therefore does not provide accurate information about the degree of reliability of the remaining time forecast. The degree of reliability of the remaining time forecast is expressed by a reliability value. The reliability value may also be referred to as dependability value and is a measure of the degree of trust that it is practically possible to have in the correctness of the estimate, wherein 1 expresses "completely sure" and 0 expresses "not sure at all". If a confidence interval is defined, the reliability value may also be expressed as a confidence level.

Embodiments of the present invention therefore address the objective technical problem of providing a method for determining at least one remaining time value, to be determined, for an installation, which method is more reliable and more efficient.

SUMMARY

An aspect relates to a computer-implemented method for determining at least one remaining time value, to be determined, for an installation, comprising the following steps:
a. providing at least one known input dataset comprising a plurality of input elements for at least one particular time;
b. providing at least one associated known remaining time value for the at least one input dataset;
c. determining the at least one remaining time value to be determined by applying an error function to the at least one known input dataset and the at least one associated known remaining time value; and
d. providing an output dataset comprising the at least one determined remaining time value and an associated reliability value.

Embodiments of the invention accordingly target a method for determining at least one remaining time value, to be determined, for an installation. The remaining time value is the duration until the next changeover time of the installation, as explained in detail further above.

The remaining time value may also be considered to be a remaining time, and the duration may be considered to be a time remaining. In the case of a light signal installation such as a traffic light as installation, the traffic light is changed over from one operating state to another operating state at the changeover time; for example, the traffic light changes from a green light to a red light. In other words, the signal change takes place at the changeover time in this example.

In a first step, the input dataset is received. The input dataset may be received via one or more interfaces by the determination unit below, such as any computing unit.

The input dataset contains a plurality of input elements for at least one particular time. In other words, consideration is given to a series or array containing known input elements. "Known" in this connection means that the input elements have been collected or obtained for example in traffic from road users from the past. The input elements may therefore also be considered to be past data elements. The input dataset with its input or data elements may accordingly also be referred to as a data vector.

Examples of input elements are signals from detectors, signal groups, public transport messages, camera signals, date and time of day. Date and time of day may be used for the particular time. Whole numbers, binary numbers or other numbers may be used for the input elements. One exemplary input dataset for a particular time reads as follows:

day of the week, hour, minute, second, state of the first signal group at the current time, . . . state of the nth signal group at the current time, state of the first detector at the current time, . . . , state of the mth detector at the current time, . . . , state of the first signal group one second ago, . . . State of the nth signal group one second ago, state of the first detector one second ago, . . . , state of the mth detector one second ago, . . . , state of the first signal group 1 second ago, . . . , state of the nth signal group 1 second ago, state of the first detector 1 second ago, . . . , state of the mth detector 1 second ago, wherein consideration is given to n signal groups and m detectors and consideration is given to a temporal history of up to 1 second in the past. The state of a respective signal group is for example coded as 1 for "free" and 0 for "blocked". The state of a respective detector is for example coded as 1 for "active" and 0 for "inactive".

There may therefore also be associated different input datasets or data vectors for different times. In this case, a plurality of input datasets at different times may result in a data matrix as input dataset, which serves as input in step a.

The associated remaining time values are known for these known input datasets. The at least one known remaining time value for the at least one input dataset is likewise provided.

In a further step, the remaining time value to be determined is determined with the aid of an error function and the associated reliability value is determined with the aid of the error function on the basis of the known input dataset and its associated known remaining time value. The error function is an asymmetric error function that is able to consider parameters. Examples of asymmetric error functions are:

$$F(x)=abs(x)*(2+sgn(x))$$

Or $$F(x)=square(x)*exp(x)$$

In a last step, an output dataset is provided. The output dataset contains the determined remaining time value from step c. and additionally its reliability value. In this case, one or more different remaining time values may be provided, as explained in detail further below. The remaining time value and its reliability value correspond to the standard of a communication protocol.

The determined remaining time value may also be referred to as forecast or estimated remaining time value. The determination may therefore also be referred to as a forecast or estimate.

The reliability value is a measure of the degree of trust that it is practically possible to have in the correctness of the estimate, wherein 1 expresses "completely sure" and 0 expresses "not sure at all". If a confidence interval is defined, the certainty may also be expressed as a confidence level.

In contrast to the conventional art, the determination according to embodiments of the invention is more precise and different remaining time values may be provided.

The remaining time value is often provided for a large group of users or a large number of road users, for example residents of a whole city. Knowing the dependability of the remaining time values, expressed by the reliability value, is essential for ensuring the safety of road users and traffic. Further application cases build on the determined remaining time values, such as routing and speed adjustments, see further below. The dependability or reliability in the product of the signal forecast leads for example to a lower risk of errors for particular application cases, such as routing.

The more accurately the remaining time and the minimum and the maximum remaining time and the uncertainty in the remaining time forecast are able to be estimated, the greater the possible use becomes in the context of traffic optimization.

The advantage is also that the determination of the remaining time to be determined, in contrast to the conventional art, is performed efficiently by the determination unit on its own or independently. It is thereby possible to save on staff and time. The determination unit is also less susceptible to errors and thus more reliable. Costs are thereby able to be reduced considerably.

The method according to embodiments of the invention may be used to train a neural network in a training phase in which the neural network performs learning. Following the training, the approach according to embodiments of the invention may be used for the trained neural network as follows:

A remaining time value to be determined may be determined by applying the trained neural network to at least one unknown input dataset. As an alternative to neural networks, other machine learning approaches are applicable.

In one embodiment, the output dataset in step d. comprises a median or an average value as remaining time value and the associated reliability value of the median or of the average value.

In a further embodiment, the output dataset in step d. furthermore comprises a minimum remaining time value and/or a maximum remaining time value.

The output datasets are accordingly able to be selected and adapted in a flexible manner depending on the underlying technical system, the determination unit, the installation, user preferences, other circumstances or requirements of the traffic. The median and its reliability value may therefore be provided. As an alternative or in addition, the minimum and/or maximum remaining time value may also be provided as a kind of "bounds" or limits based on the median and its reliability value.

In other words, an estimate of at least two further quantiles is also ascertained in addition to an estimate of the average value of the remaining time or alternatively the median of the remaining time.

In a further embodiment, the installation is a light signal installation or another installation in the field of traffic.

In a further embodiment, the computer-implemented method furthermore comprises the following step:

performing a measure, wherein the measure is selected from the group consisting of:
outputting the output dataset and/or associated data on a display unit,
storing the output dataset and/or associated data in a storage unit, and
transmitting the output dataset and/or associated data to a computing unit.

In a further embodiment, the measure is performed depending on the at least one associated reliability value of the at least one remaining time value.

One or more measures may accordingly be initiated after determining the remaining time value to be determined according to the method according to embodiments of the invention. The measures may be performed simultaneously, in succession or else in stages.

First of all, the output dataset may be displayed to the user on a display unit of a computing unit. The output dataset may furthermore be stored or transmitted, in the form of an appropriate message or communication, to another unit, such as a terminal, a control unit or another computing unit. The receiving computing unit may likewise initiate further appropriate measures following receipt. Further measures are route planning, starting an engine of a vehicle or other control measures for a vehicle.

By way of example, the computing unit of a vehicle may receive the output dataset and trigger a control measure depending on the reliability value of the median.

Embodiments of the invention furthermore relate to a determination unit. The method according to embodiments of the invention is accordingly performed by a determination unit. The determination unit is any computing unit. In addition to determining the output dataset, the determination unit may also initiate one or more of the above measures itself. The measures are thereby taken promptly and efficiently.

Embodiments of the invention furthermore relate to a computer program product (non-transitory computer readable storage medium having instructions, which when executed by a processor, perform actions) containing a computer program that has means for performing the method described above when the computer program product is executed on a program-controlled apparatus.

A computer program product, such as for example a computer program means, may be provided or supplied for example as a storage medium, such as for example a memory card, USB stick, CD-ROM, DVD, or else in the form of a file downloadable from a server in a network. This may take place for example in a wireless communication network by transmitting an appropriate file containing the computer program product or the computer program means. A control apparatus, such as for example an industrial control PC or a programmable logic controller, PLC for short, or a microprocessor or a smart card or the like may in particular be considered as program-controlled apparatus.

BRIEF DESCRIPTION

Some of the embodiments will be described in detail, with reference to the following figures, wherein like designations denote like members, wherein.

DETAILED DESCRIPTION

Embodiments of the present invention are described below with reference to the figures.

Figure 1:
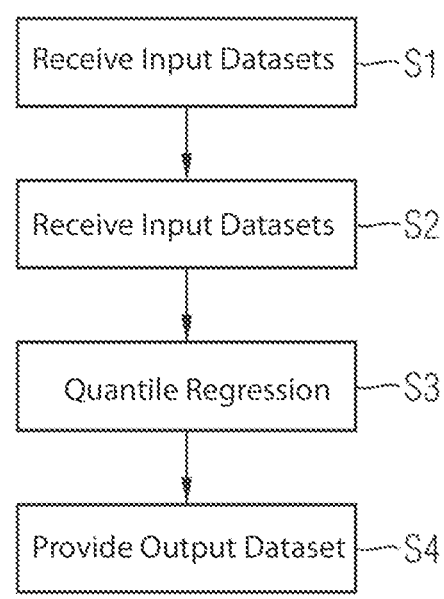
FIG. 1 shows a flowchart according to embodiments of the invention of the method for determining at least one remaining time value, to be determined, for an installation.
Figure 4:
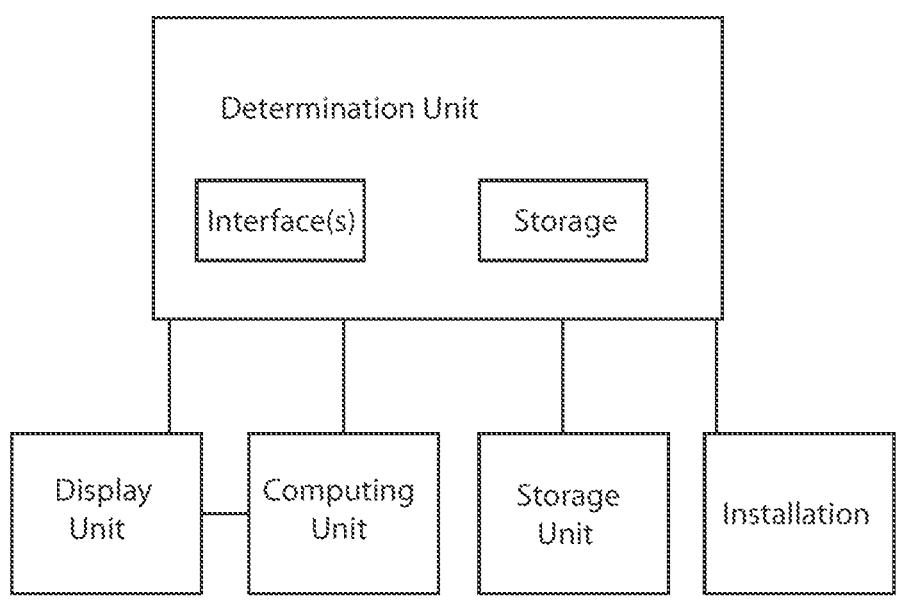
FIG. 4 shows a determination unit according to an embodiment of the invention.

FIG. 1 schematically illustrates a flowchart of the method according to embodiments of the invention comprising the method steps S1 to S4. The individual method steps may each be performed by the determination unit or else its subunits, as shown in FIG. 4. In the first two steps S1 and S2, the input datasets are received, specifically the data vector j as known input dataset and the target variables $T\_i,j$ as known remaining time.

Quantile Regression S3

Based on recorded data that consist of various measured and/or previously calculated values, some of which are used as input variables and others as target variables, according to one embodiment, it is possible to train an artificial neural network.

For each data vector j of the dataset, one or more output variables $O\_i,j$ are calculated by the artificial neural network during the optimization of the forecast or regression based on the input variables. For each data vector j, the difference between output variable $O\_i,j$ and target variable $T\_i,j$ is calculated as follows:

$$D\_i,j = O\_i,j - T\_i,j.$$

The local error function f defines to what extent a respective difference $D\_i,j$ influences the overall error that needs to be minimized. The squared error function $f(D\_i,j)=D\_i,j*D\_i,j$ may be used to estimate the expected value of a distribution of target values. The absolute value function $f(D\_i,j)=abs(D\_i,j)$ as error function may be used to estimate the median of a distribution of target values.

The asymmetric absolute value function, as asymmetric error function, may be used to estimate different quantiles. The asymmetric error function may be represented as follows:

$$f(D\_i,j)=2*(\text{Heaviside}(-D\_i,j)*a*-D\_i,j+\text{Heaviside}(D\_i,j)*(1-a)*D\_i,j), \text{ wherein } a \text{ in } \backslash[0,1\backslash]$$

Figure 2:
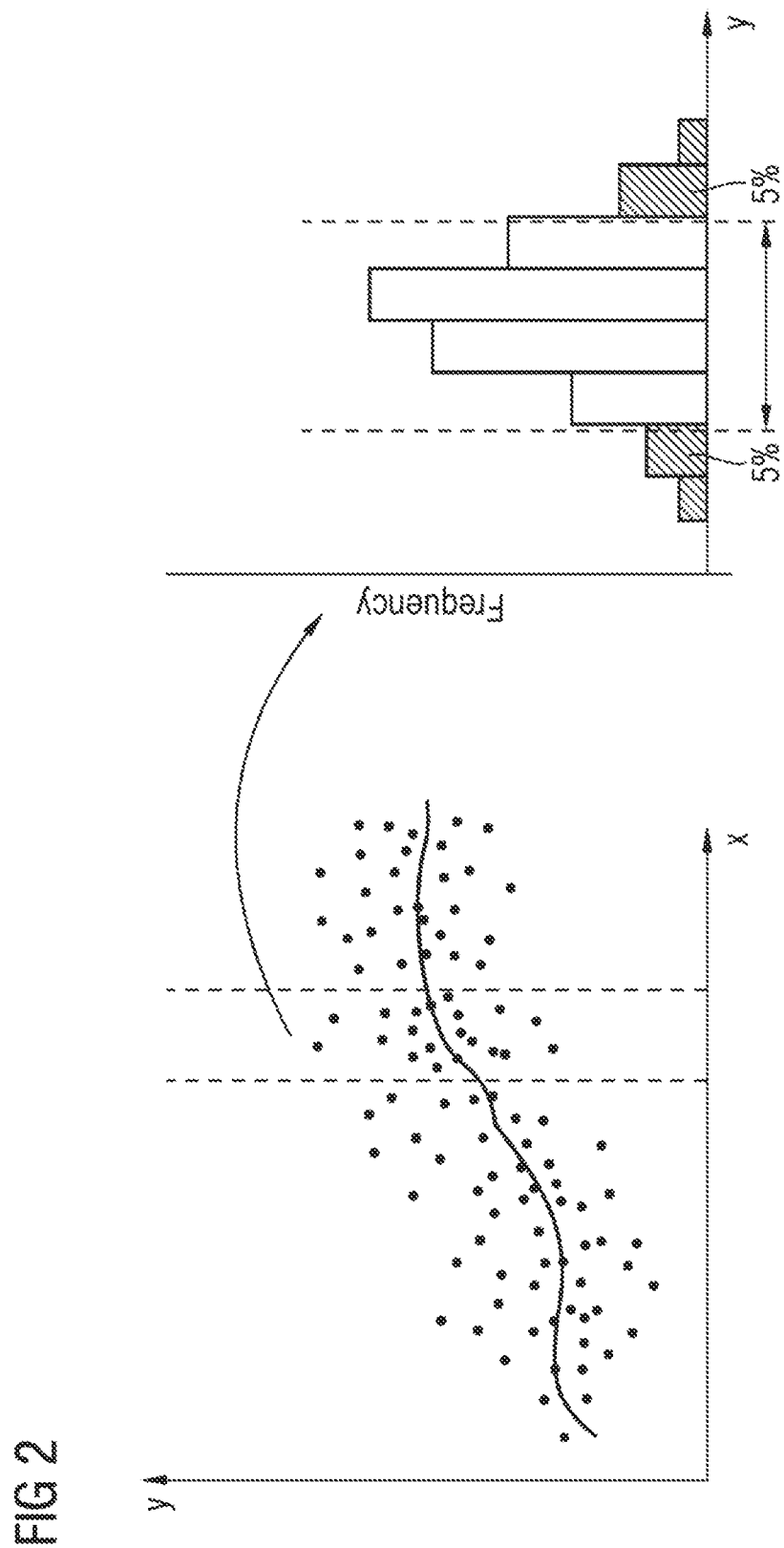
FIG. 2 shows the determination of a 5% quantile and a 95% quantile according to one embodiment of the invention.
Figure 3:
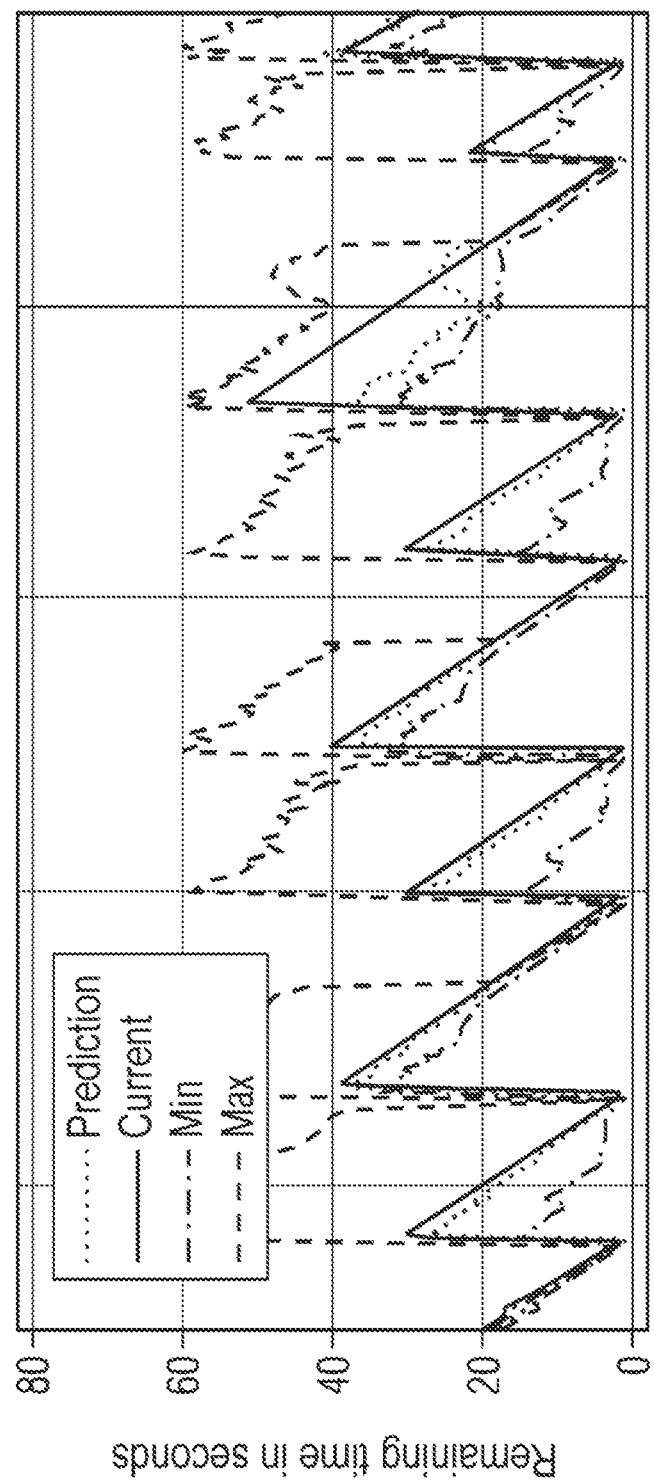
FIG. 3 shows a remaining time forecast according to one embodiment of the invention.

By way of example, a=0.5 leads to the absolute value function and thus to the estimate of the median, that is to say of the 0.5 quantile, as illustrated in FIG. 2.

FIG. 2 illustrates the estimation of the quantiles. A dependent variable y, which is selected in the regression task as target value, for example the remaining time, is plotted against an independent variable x, for example time, by way of example in the left-hand part. The points symbolize the individual measured values, and the line symbolizes the result of a regression that approximates or estimates the functional relationship y=g(x). The exact y values of the data points are not able to be predicted by the regression line due to unobserved influences and/or noise. However, in each interval of x, the average value of they values is approximated in this interval. Such an interval is symbolized by the two perpendicular dashed lines.

The distribution of the deviation of the measured y values from the regression curve is illustrated as a histogram on the right-hand side. By virtue of using the described asymmetric error function, it is possible to determine regression curves that do not depict the average value or the median, but rather other quantiles, such as for example the 5% quantile or the 95% quantile.

When a=0.01, the 0.01 quantile is estimated, for example, when a=0.99, the 0.99 quantile is estimated, etc. (not illustrated).

The minimum remaining time may accordingly be estimated approximately as the 0.01 quantile and the maximum remaining time may be estimated by the 0.99 quantile. The uncertainty $U\_i,j$ may be indicated as an inter-quantile distance, for example as follows:

$$U\_i,j=b*((Q\_c)\_i,j-(Q\_d)\_i,j)),$$

wherein b is a scaling factor, c is the higher quantile and d is the lower quantile. For example, as follows:

$$U\_i,j=1/0.675*((Q\_0.25)\_i,j-(Q\_0.75\_i,j)$$

Likelihood Forecast

As an alternative, a model, such as for example a neural network, instead of the remaining time, given the context x, may forecast the parameters of a Gaussian distribution, given by expected value (mu) and variance (sigma-2) depending on the context. This approach results in a heteroskedastic (state-dependent) Gaussian distribution in the forecast. The abovementioned quantiles may then be calculated therefrom. For training, the log likelihood function may be used for this purpose:

$$mu, sigma^2 = f(x; W)$$

$$E(W) = -\log p(y|x,w) = 0.5*\ln(2*pi*sigma^2) + (mu-y)^2/(2*sigma^2)$$

Bayesian Neural Networks

As an alternative, a Bayesian neural network (BNN) may be used to estimate the uncertainty in the remaining time by way of parameter uncertainty. For this purpose, a BNN is trained to estimate the remaining time. From the resultant uncertainty regarding the parameters, it is then possible to empirically ascertain a forecast uncertainty, and to determine quantiles, maximum and minimum estimates etc. therefrom.

In the last step S4, the output dataset is provided, for example output to a user or transmitted to a computing unit.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE SIGNS

S1 to S4 method steps 1 to 4

The invention claimed is:

1. A computer-implemented method for determining at least one remaining time value, to be determined, for an installation in a field of traffic, wherein the remaining time value is a duration until a next changeover time of the installation and, at a changeover time, the installation is changed over from one operating state to another operating state, the method comprising:
   a. providing at least one known input dataset containing a plurality of input elements for at least one particular time;
   b. providing at least one associated known remaining time value for the at least one input dataset;
   c. determining the at least one remaining time value to be determined by applying an error function to the at least one known input dataset and the at least one associated known remaining time value; and
   d. providing an output dataset comprising the at least one determined remaining time value and at least one associated reliability value.

2. The computer-implemented method as claimed in claim 1, wherein the output dataset in step d. comprises a median or average value as remaining time value and the associated reliability value of the median or average value.

3. The computer-implemented method as claimed in claim 2, wherein the output dataset in step d. comprises a minimum remaining time value and/or a maximum remaining time value.

4. The computer-implemented method as claimed in claim 1, wherein the installation is a light signal installation.

5. The computer-implemented method as claimed in claim 1, further comprising:
   performing a measure, wherein the measure is selected from the group consisting of:
      outputting the output dataset and/or associated data on a display unit;
      storing the output dataset and/or associated data in a storage unit; and
      transmitting the output dataset and/or associated data to a computing unit.

6. The computer-implemented method as claimed in claim 5, further comprising performing the measure depending on the at least one associated reliability value of the at least one determined remaining time value.

7. A determination unit for performing the computer-implemented method as claimed in claim 1.

8. A computer program product, comprising a computer readable hardware storage device having computer readable program code stored therein, said program code executable by a processor of a computer system to implement a method as claimed in claim 1, when the computer program is executed on a program-controlled apparatus.

* * * * *